Oct. 26, 1948.  F. G. MERCKEL  2,452,385
COLOR COMPARISON APPARATUS
Filed Dec. 30, 1943  2 Sheets-Sheet 1
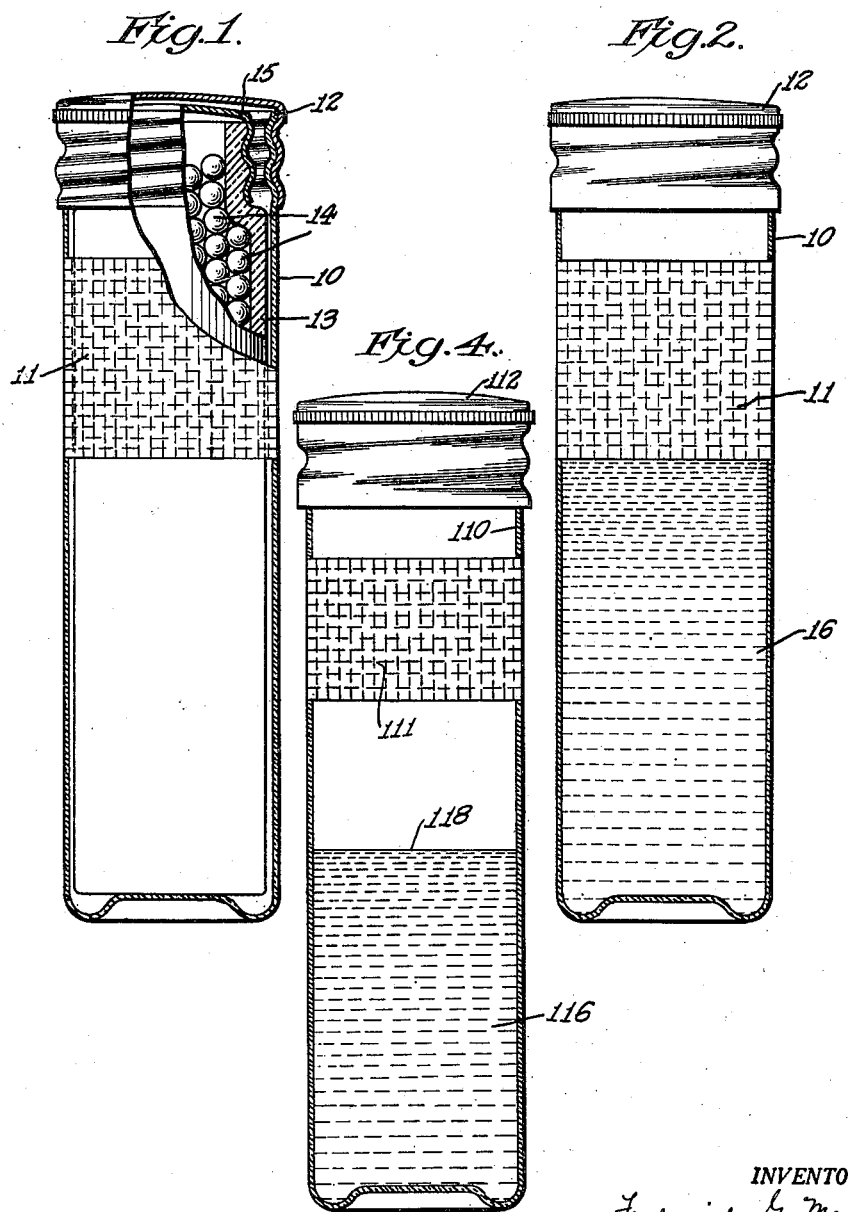
INVENTOR.
Frederick G. Merckel
BY
John C. Kerr
ATTORNEY Oct. 26, 1948.　　　　F. G. MERCKEL　　　　2,452,385
COLOR COMPARISON APPARATUS
Filed Dec. 30, 1943　　　　　　　　　　　　　　2 Sheets-Sheet 2
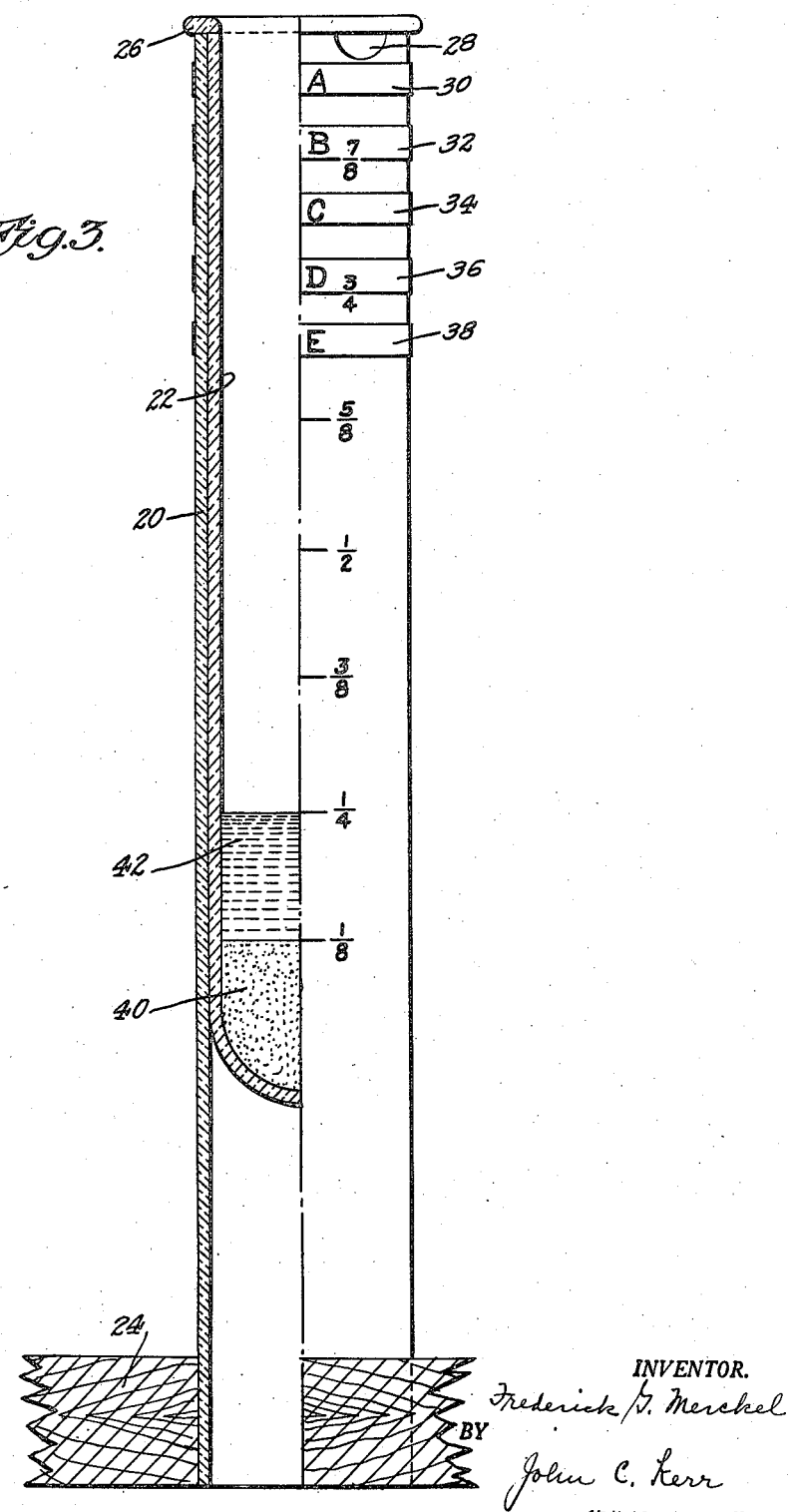

Patented Oct. 26, 1948

2,452,385

UNITED STATES PATENT OFFICE 2,452,385

COLOR COMPARISON APPARATUS

Frederick G. Merckel, Montclair, N. J.

Application December 30, 1943, Serial No. 516,174

1 Claim. (Cl. 23—253)

This invention relates to test apparatus. More particularly it relates to test apparatus comprising a combined color comparator and container, especially adapted for use by comparatively inexperienced persons and to a method of use thereof.

The invention, in one of its aspects, comprises a combined color comparator and container having a translucent wall provided with a translucent colored part above the bottom and adapted to be compared by trans-illumination with the color of a liquid within the container.

The invention in one of its preferred forms, comprises a translucent outer container within which is housed, until used for a test, an inner container loaded with an indicator; and the outer container is provided with a suitably colored translucent wall portion to serve as a color comparator for a solution subjected to the action of the indicator.

The invention may, however, be employed in other forms of apparatus, in other environments, and for other purposes, some of which will be hereinafter pointed out.

Referring to the drawings, which illustrate what I now consider to be a preferred form of the invention:

Fig. 1 is an elevation, partly broken away, of apparatus embodying the invention, Fig. 2 is a view of a container containing a sample of a solution to be tested, Fig. 3 is an elevation, partly in section, of a different form of apparatus embodying the invention, and Fig. 4 is a view similar to Fig. 2, but illustrating a modification.

Referring first to Fig. 2, it will be seen that I provide a container comprising a tube or hollow cylinder 10 of translucent (preferably transparent) material such as glass or suitable solidified plastic material which is water-resistant and also resistant to the materials to be tested. An upper portion or zone of the container 10 is suitably colored, as at 11, by lacquering, staining, dyeing, affixing by cementation a translucent color band, or the like. The colored portion 11 extends around the wall of the container 10 to form a band and is translucent. For a purpose hereinafter appearing, the container 10 is shown provided with a detachable screw top 12 which may be opaque or translucent, as desired. The particular top 12 shown in Fig. 2 is made of metal but it may be made of other suitable material.

With or without the top 12, the container 10 may be used as follows. A sample of liquid to be tested, such, for example, as a heat-treated liquid, such as oil, is poured into the container 10 until the upper surface of the liquid 16 reaches the lower edge of the color band 11. There will then be a predetermined volume, i. e. measured quantity, of the liquid 16 in the container 10. The color of the sample 16 is then compared with the predetermined color of the band 11. Accurate comparison is facilitated by the light transmitted through the colored band 11 and the sample liquid 16, because of the juxtaposition of the colors to be compared and because both colors are viewed by transillumination. The color band 11 not only serves, by virtue of its selected or predetermined color, as a standard for color comparison but its lower edge constitutes a graduate mark so that a predetermined quantity of the liquid is tested.

The form of my invention shown in Fig. 1, including apparatus such as that shown in Fig. 2 and described above, is for testing the amount of free chlorine in water, by the so-called orthotolidine test. In addition to its functions as a measuring device and color comparator, the tube 10 now constitutes also an outer container to receive an inner container loaded with an indicator. The color of the band 11 is, in this particular case, a predetermined light yellow.

The outer container 10 is adapted to receive and contain (see Fig. 1) an inner container 13 which is loaded with orthotolidine pellets 14. The inner container 13 is opaque and of such material as to prevent deterioration of the material with which it is loaded. The inner container 13 is shown provided with a detachable cap 15 similar to the cap 12 of the outer container 10, though smaller.

The various elements are so proportioned and designed as to operate as presently to be described.

Water, which has been chlorinated with the object of rendering it safe for drinking by human beings, is to be tested.

The cap 12 and contents 13—15 are removed from the outer container 10. The outer container or vial 10 is filled up to the bottom of the colored band 11 with a sample 16 of the chlorinated water (see Fig. 2). The band 11 is so placed or located on the container 10 that the clear (not colored) compartment of the container holds a definite predetermined portion of the water to be tested so that the indicator, in this case orthotolidine tablets, can be added in proper proportion. One of the pellets 14 is then dropped into the sample 16 and the latter shaken to accelerate dissolution of the pellet. After the pellet has dissolved the color of the sample of the chlorinated water is compared with that of the band 11. Accurate comparison is facilitated by the light transmitted through the colored band 11 and the sample solution 16 because of the juxtaposition of the colors to be compared and because both colors are viewed by trans-illumination. If the sample is a lighter yellow than the band, more chlorination of the water is required, as by adding calcium hypochlorite to it. If the color of the sample is the same as the band 11, or is a somewhat darker yellow, the water being tested is satisfactory and will be fit for drinking in about thirty minutes. If the sample is an orange color, the water has been over-chlorinated and more untreated water should be added to the chlorinated water and the mixture then re-tested. To guide the user, the directions may be printed, engraved, or otherwise depicted on the outside of the inner container 13.

It will be understood that the apparatus, or similar apparatus, may be used to test other liquids, for other contents, by providing a suitable indicator within the inner container 13 and a suitably colored band 11 on the outer container 10.

In Fig. 3 there is shown a form of apparatus particularly adapted for testing soils; for example, to test for nitrogen or potash, or pH, or phosphorus by using suitable indicators in a solution in contact with a particular soil sample. This apparatus comprises an outer container 20 which may be conveniently constructed of transparent glass tubing the lower end of which is inserted, preferably detachably, in a suitable wooden base 24. The outer container 20 is adapted telescopically to receive an inner container 22 which may be a standard form of clear wall test tube having an upper flange 26 adapted to rest upon the upper edge of the tube 20. The tube 20 is shown provided with a cut-out portion 28 at its upper end to facilitate lifting the inner container 22 upwardly or out of the outer container 20 by inserting the thumb or finger of the user. The outer container 20 is shown calibrated according to the volume of the inner container or test tube 22, i. e. the "⅛" mark on the outer tube 20 indicates the level at which the test tube 22 is one-eighth full, the "¼" mark on the outer container 20 indicates the level at which the test tube is one-fourth full, etc. The outer container 20 is provided with a plurality of bands 30, 32, 34, 36 and 38 of Celluloid or the like which are preferably slidably mounted on the outer container 20 so as to be adjustable vertically thereon and, if desired, removable therefrom. These bands are of different colors or tints so selected as to be comparable with the color of a solution containing an indicator within the test tube 22. The particular colors or tints of these bands will depend upon the nature of the test that is being made and the kind of indicator that is employed. Each of these color bands is translucent so as to be capable of color comparison by trans-illumination and each color band is shown provided with an indicating letter (A, B, C, D, E) to be keyed against an instruction sheet (not shown) informing the user as to the particular characteristic revealed by the color comparison.

The use of the apparatus, such as that shown in Fig. 3, will be understood in view of the following example. A predetermined quantity of soil 40 to be tested is placed in the test tube or inner container 22. This may be conveniently measured by virtue of the above described graduations "⅛, ¼" and so forth referred to above. In the particular example under consideration, the inner container is one-eighth full of soil to be tested. To this there is added a solution containing the proper indicator until the inner container 22 is now say one-fourth full. The solution 42 containing the indicator and the soil sample 40 are now thoroughly mixed by shaking the contents of the test tube 22; a suitable cork or stopper (not shown) being provided at the upper end of the test tube to facilitate the mixing operation. The contents of the test tube are then permitted to stand for a prescribed time (with the relative position of the parts as shown in Fig. 3) and after that time has elapsed the solid contents of the mixture will have settled to the bottom of the test tube and there will be found above them a colored liquid. The color of this liquid is to be compared with the color bands 30, 32, 34, 36 or 38. This may be conveniently done by raising the inner container 22 vertically with respect to the outer container 20 until the upper surface of the colored liquid within the test tube coincides with the lower edge of the one of the colored bands the color of which is the same or most nearly approaches that of the solution being tested. Let us assume that the color band 34 is the one that satisfies this requirement. The user would then refer to his instruction sheet under the key letter "C" and there find the desired information as to the characteristic of the sample of soil under test. If desired, instead of raising the test tube or inner container 22 the color bands 30, 32, 34, 36 and 38 may be slid downwardly on the outer tube or container 20 to effect the color comparison. It will be understood that the particular color bands 30, 32, 34, 36 and 38 may be removed from the outer container and replaced by other suitably colored bands depending upon the particular test being made and upon the indicator employed.

In the form of the invention shown in Figs. 1 and 2, and described herein above, a solid indicator (14) was described. In some cases it may be desirable to use a liquid indicator and to facilitate this, the apparatus shown in Fig. 4 may be employed. The parts or elements 110, 111, 112, and 116 shown in Fig. 4 correspond respectively to the parts or elements 10, 11, 12, and 16 shown in Fig. 2 and previously described, it being understood that the color band 111 would be of such color and with its lower edge so placed as to suit the particular test desired to be made. The container 110 is additionally provided with a graduation mark 118 so placed as to mark or indicate the upper level of a sample of the particular liquid 116 desired to be tested. The vertical distance between the lower edge of the band 111 and the graduation mark 118 indicates the depth of the liquid indicator or other reagent to be employed for the test. In using the form of device shown in Fig. 4, the container 110 is filled up to the mark 118 with the liquid to be tested. The liquid indicator, or other reagent, is then added to the sample 116 until the upper surface or level of the combined liquid reaches the lower edge of the band 111. The color of the liquid may then be compared by trans-illumination with the color of the band 111.

By "indicator," as used herein and in the appended claims, I mean any substance used to indicate to the eye, by its capacity for color change, the condition of a solution as to the presence of free acid, or alkali, or any other substance the presence of which it is desired to detect.

In accordance with the provisions of the patent statutes, I have herein described the principle of operation of my invention, together with the apparatus which I now consider to represent the best embodiments thereof, but I desire to have it understood that the apparatus disclosed are only illustrative and that the invention can be carried out by other means. Also, while it is designed to use the various features and elements in the combinations and relations described, some of these may be altered and others omitted, without interfering with the more general results outlined, and the invention extends to such use within the scope of the appended claim.

What I claim is:

A color comparison apparatus for use in trans-illumination, comprising a substantially cylindrical, smooth-walled container of substantially uniform wall thickness and of substantially colorless, translucent solidified plastic material, said container having a mouth portion having an internal diameter substantially the same as that of the body portion of the container, said mouth portion being formed to provide external threads, a removable closure adapted to be threaded onto said mouth portion, and a color band of translucent lacquer superimposed on the upper part of the body portion of said container and extending entirely around it, said color band being relatively wide as compared to the height of said container, a second container for a supply of an indicator to be used in definite amount in any one test comparison, said second container being removably disposed within the first named container, said color band having a color such that when viewed by trans-illumination it will provide a color field of exactly the color of the solution contiguous therewith and to which has been added a predetermined quantity of said indicator when that solution has a desired concentration of the material for which the test is being made.

FREDERICK G. MERCKEL.

REFERENCES CITED

The following references are of record in the file of this patent:

UNITED STATES PATENTS

| Number | Name | Date |
| --- | --- | --- |
| 431,132 | Wharton | July 1, 1890 |
| 639,350 | Brown | Dec. 19, 1899 |
| 665,468 | Robinson | Jan. 8, 1901 |
| 1,052,991 | Zitzmann et al. | Feb. 11, 1913 |
| 1,164,555 | Snellings | Dec. 14, 1915 |
| 1,386,571 | Jackson | Aug. 2, 1921 |
| 1,986,403 | Lehmkuhl | Jan. 1, 1935 |
| 2,009,943 | Munsell et al. | July 30, 1935 |
| 2,346,261 | Kamlet | Apr. 11, 1944 |

OTHER REFERENCES

Yoe, Photometric Chem. Anal., vol. 1, 198, pages 3, 4, 12.

Eimer & Amend 85th Anniversary Catalog, 1936, page 94.